(12) United States Patent
Keeriyadath et al.

(10) Patent No.: US 9,569,317 B2
(45) Date of Patent: *Feb. 14, 2017

(54) MANAGING VIOS FAILOVER IN A SINGLE STORAGE ADAPTER ENVIRONMENT

(71) Applicant: International Business Machines Corporation, Armonk, NY (US)

(72) Inventors: Sangeeth Keeriyadath, Kozhikode (IN); Mallesh Lepakshaiah, Bangalore (IN); Pruthvi P. Nataraj, Bangalore (IN); Sanket Rathi, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 203 days.

This patent is subject to a terminal disclaimer.

(21) Appl. No.: 14/514,699

(22) Filed: Oct. 15, 2014

(65) Prior Publication Data

US 2016/0077938 A1 Mar. 17, 2016

Related U.S. Application Data

(63) Continuation of application No. 14/483,307, filed on Sep. 11, 2014.

(51) Int. Cl.
*G06F 11/00* (2006.01)
*G06F 11/20* (2006.01)
*G06F 11/07* (2006.01)

(52) U.S. Cl.
CPC ....... *G06F 11/2002* (2013.01); *G06F 11/0757* (2013.01); *G06F 11/2005* (2013.01);
(Continued)

(58) Field of Classification Search
CPC .............. G06F 11/2005; G06F 11/1482; G06F 9/45558; H04L 41/0668; H04L 43/10
See application file for complete search history.

(56) References Cited

U.S. PATENT DOCUMENTS 7,743,107 B2   6/2010  Kovacs et al.
7,782,869 B1 *  8/2010  Chitlur Srinivasa . G06F 9/5011
                                                       370/230
(Continued)

OTHER PUBLICATIONS

IBM: List of IBM Patents or Patent Application Treated as Related (Appendix P).

(Continued)

*Primary Examiner* — Bryce Bonzo
*Assistant Examiner* — Jeison C Arcos
(74) *Attorney, Agent, or Firm* — Robert C. Bunker

(57) ABSTRACT

According to one exemplary embodiment, a method for VIOS failover in an environment with a physical storage adapter is provided. The method may include assigning the physical storage adapter to a first VIOS, wherein the physical storage adapter has I/O connectivity to at least one storage device. The method may include configuring a first I/O path between the first VIOS and a second VIOS. The method may include configuring a second I/O path from a client partition to the first VIOS, wherein the second I/O path is set as a primary I/O path. The method may include configuring a third I/O path from the client partition to the second VIOS. The method may include determining the first VIOS is inaccessible. The method may include unassigning the physical storage adapter from the first VIOS. The method may include assigning the physical storage adapter to the second VIOS.

8 Claims, 7 Drawing Sheets

(52) U.S. Cl.
CPC ...... *G06F 11/2017* (2013.01); *G06F 11/2033* (2013.01); *G06F 2201/805* (2013.01); *G06F 2201/815* (2013.01)

(56) References Cited

U.S. PATENT DOCUMENTS

| | | | | |
|---|---|---|---|---|
| 7,783,788 B1* | 8/2010 | Quinn | ................... | G06F 9/5077 710/10 |
| 8,041,987 B2* | 10/2011 | Allen | ................. | G06F 11/2005 714/4.11 |
| 8,677,374 B2* | 3/2014 | Aslot | ................. | G06F 9/45558 714/2 |
| 2005/0120160 A1* | 6/2005 | Plouffe | ............... | G06F 9/45537 711/1 |
| 2006/0250945 A1* | 11/2006 | Fernandes | ............... | H04L 43/10 370/216 |
| 2008/0201414 A1* | 8/2008 | Amir Husain | .......... | G06F 9/445 709/203 |
| 2009/0307377 A1* | 12/2009 | Anderson | ............. | G06F 9/5016 710/3 |
| 2009/0319728 A1* | 12/2009 | Bakke | .................. | G06F 3/0626 711/153 |
| 2010/0122111 A1* | 5/2010 | Allen | ................. | G06F 11/2005 714/3 |
| 2011/0179214 A1* | 7/2011 | Goggin | ................... | G06F 3/061 711/6 |
| 2011/0179414 A1* | 7/2011 | Goggin | ................... | G06F 3/061 718/1 |
| 2012/0066678 A1* | 3/2012 | Pafumi | ............... | G06F 9/45558 718/1 |
| 2012/0144233 A1* | 6/2012 | Griffith | ............... | G06F 11/1443 714/13 |
| 2012/0179771 A1* | 7/2012 | Ganti | .................. | G06F 11/1425 709/213 |
| 2012/0179798 A1* | 7/2012 | Pafumi | ................. | G06F 9/5072 709/223 |
| 2012/0179837 A1* | 7/2012 | Bender | ................... | H04L 69/22 709/238 |
| 2012/0180070 A1* | 7/2012 | Pafumi | .................. | G06F 9/542 719/313 |
| 2012/0246517 A1* | 9/2012 | Bender | ............... | G06F 11/0712 714/45 |
| 2013/0194912 A1* | 8/2013 | Baratakke | ........... | G06F 11/2005 370/220 |
| 2015/0006950 A1* | 1/2015 | Gurram | ............... | G06F 11/2028 714/4.12 |
| 2015/0006951 A1* | 1/2015 | Gurram | ............... | G06F 11/2028 714/4.12 |
| 2016/0034366 A1* | 2/2016 | Anglin | ................ | G06F 11/1458 714/4.11 |

OTHER PUBLICATIONS

Kerriyadath et al., "Managing VIOS Failover in a Single Storage Adapter Environment", U.S. Appl. No. 14/483,307, filed Sep. 11, 2014, 32 pages.

* cited by examiner

MANAGING VIOS FAILOVER IN A SINGLE STORAGE ADAPTER ENVIRONMENT

CROSS REFERENCE

The present application is a continuation of and claims priority under 35 U.S.C. §120 of U.S. patent application Ser. No. 14/483,307, filed on Sep. 11, 2014, which is incorporated by reference in its entirety.

BACKGROUND

The present invention relates generally to the field of computing, and more particularly to failover management.

In order to increase application availability to client logical partitions, multiple virtual input output server (VIOS) instances may be configured to virtualize input output (I/O) from client partitions to the storage devices linked to a single electronic device, such as a server. A multiple VIOS environment may be utilized to provide I/O redundancy from storage devices to client logical partitions in the event a VIOS instance goes down. A VIOS may go down due to planned or unplanned outages that may require failover from an unavailable VIOS to a functional VIOS. Through the failover process, client logical partitions may have uninterrupted I/O to storage devices linked to the electronic device through a physical storage adapter associated with a VIOS instance. Some electronic device configurations running a multiple VIOS environment may have fewer physical storage adapters installed than the number of VIOS instances.

SUMMARY

According to one exemplary embodiment, a method for virtual input output server (VIOS) failover in an environment with a physical storage adapter is provided. The method may include assigning the physical storage adapter to a first VIOS, wherein the physical storage adapter has input output (I/O) connectivity to at least one storage device. The method may then include configuring a first I/O path between the first VIOS and a second VIOS, wherein the second VIOS has access to the at least one storage device through the first VIOS. The method may also include configuring a second I/O path from a client partition to the first VIOS and the at least one storage device through the physical storage adapter assigned to the first VIOS, wherein the second I/O path is set as a primary I/O path for an I/O request sent by the client partition. The method may further include configuring a third I/O path from the client partition to the second VIOS, wherein the client partition is enabled to access the at least one storage device through a combination of the third I/O path and the first I/O path. The method may also include determining the first VIOS is inaccessible. The method may then include unassigning the physical storage adapter from the first VIOS based on the determining the first VIOS is inaccessible. The method may further include assigning the physical storage adapter to the second VIOS based on the unassigning of the physical adapter from the first VIOS.

According to another exemplary embodiment, a computer system for virtual input output server (VIOS) failover in an environment with a physical storage adapter is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include assigning the physical storage adapter to a first VIOS, wherein the physical storage adapter has input output (I/O) connectivity to at least one storage device. The method may then include configuring a first I/O path between the first VIOS and a second VIOS, wherein the second VIOS has access to the at least one storage device through the first VIOS. The method may also include configuring a second I/O path from a client partition to the first VIOS and the at least one storage device through the physical storage adapter assigned to the first VIOS, wherein the second I/O path is set as a primary I/O path for an I/O request sent by the client partition. The method may further include configuring a third I/O path from the client partition to the second VIOS, wherein the client partition is enabled to access the at least one storage device through a combination of the third I/O path and the first I/O path. The method may also include determining the first VIOS is inaccessible. The method may then include unassigning the physical storage adapter from the first VIOS based on the determining the first VIOS is inaccessible. The method may further include assigning the physical storage adapter to the second VIOS based on the unassigning of the physical adapter from the first VIOS.

According to yet another exemplary embodiment, a computer program product for virtual input output server (VIOS) failover in an environment with a physical storage adapter is provided. The computer program product may include one or more computer-readable storage devices and program instructions stored on at least one of the one or more tangible storage devices, the program instructions executable by a processor. The computer program product may include program instructions to assign the physical storage adapter to a first VIOS, wherein the physical storage adapter has input output (I/O) connectivity to at least one storage device. The computer program product may also include program instructions to configure a first I/O path between the first VIOS and a second VIOS, wherein the second VIOS has access to the at least one storage device through the first VIOS. The computer program product may then include program instructions to configure a second I/O path from a client partition to the first VIOS and the at least one storage device through the physical storage adapter assigned to the first VIOS, wherein the second I/O path is set as a primary I/O path for an I/O request sent by the client partition. The computer program product may further include program instructions to configure a third I/O path from the client partition to the second VIOS, wherein the client partition is enabled to access the at least one storage device through a combination of the third I/O path and the first I/O path. The computer program product may also include program instructions to determine the first VIOS is inaccessible. The computer program product may then include program instructions to unassign the physical storage adapter from the first VIOS based on the determining the first VIOS is inaccessible. The computer program product may further include program instructions to assign the physical storage adapter to the second VIOS based on the unassigning of the physical adapter from the first VIOS.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
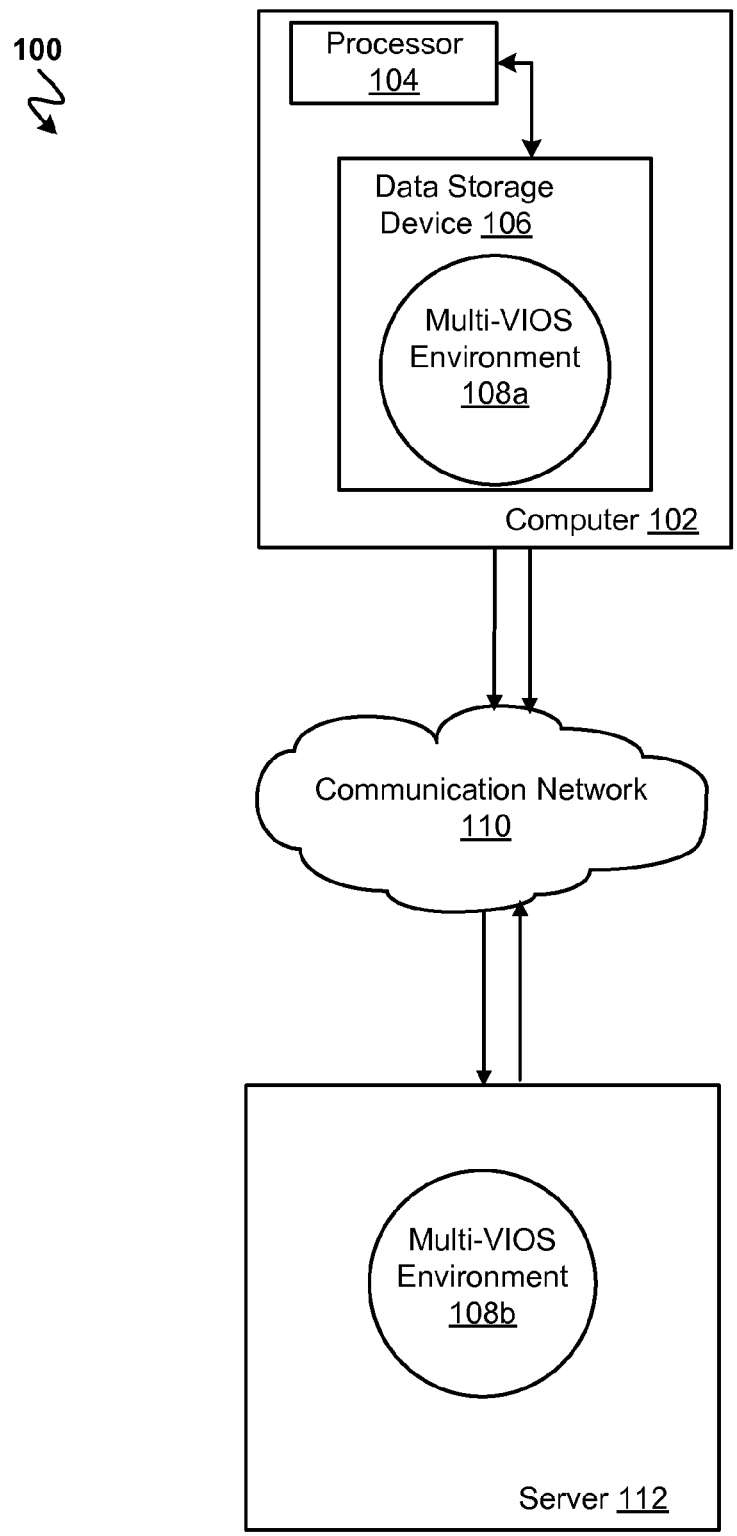
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for managing VIOS failover in a single storage adapter environment.

As described above, an electronic device (e.g., server) running multiple VIOS instances (e.g., two VIOS instances), may have fewer storage adapters (e.g., one) installed than VIOS instances running. A VIOS may be utilized within a server to virtualize I/O to one or more client partitions. Some server configurations may contain fewer storage adapters than VIOS instances to lower server costs. The multiple VIOS instances may be configured to provide I/O redundancy for client logical partitions that also run on the same server as the VIOS instances. Redundant VIOS instances may provide client logical partitions with continued I/O to the storage devices (e.g., hard disk drives) connected to the storage adapter inside a server despite a failure of one of the VIOS instances. In response to a VIOS failure, the client partition's I/O requests may failover to one of the redundant VIOS instances that may be available to serve the I/O requests.

However, in a server that has fewer physical storage adapters than VIOS instances, failover may not be achieved since a redundant VIOS may not have access to a physical storage adapter, and thus not have access to the storage devices necessary to allow the VIOS to serve client I/O requests. As such, client partitions may experience issues (i.e., hanging or crashing) as a result of the client partitions losing I/O connectivity with the storage devices. Therefore, it may be advantageous to, among other things, have a method to dynamically move a storage adapter from one VIOS instance to another VIOS instance within an electronic device, thereby achieving failover in an electronic device that may have more VIOS instances than installed physical storage adapters.

Referring now to FIG. 1, an exemplary networked computer environment 100 in accordance with one embodiment is depicted. The networked computer environment 100 may include a computer 102 with a processor 104 and a data storage device 106 that is enabled to run a multiple virtual input output server (multi-VIOS) environment 108a. The networked computer environment 100 may also include a server 112 that is enabled to run a multi-VIOS environment 108b and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 7, server computer 112 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

Software, such as a multi-VIOS environment 108a and 108b may run on the client computer 102 or on the server computer 112. The multi-VIOS environment 108a and 108b may be utilized to provide input output (I/O) redundancy to client logical partitions. The multi-VIOS environment 108a and 108b is explained in further detail below with respect to FIGS. 2 and 3.

Figure 2:
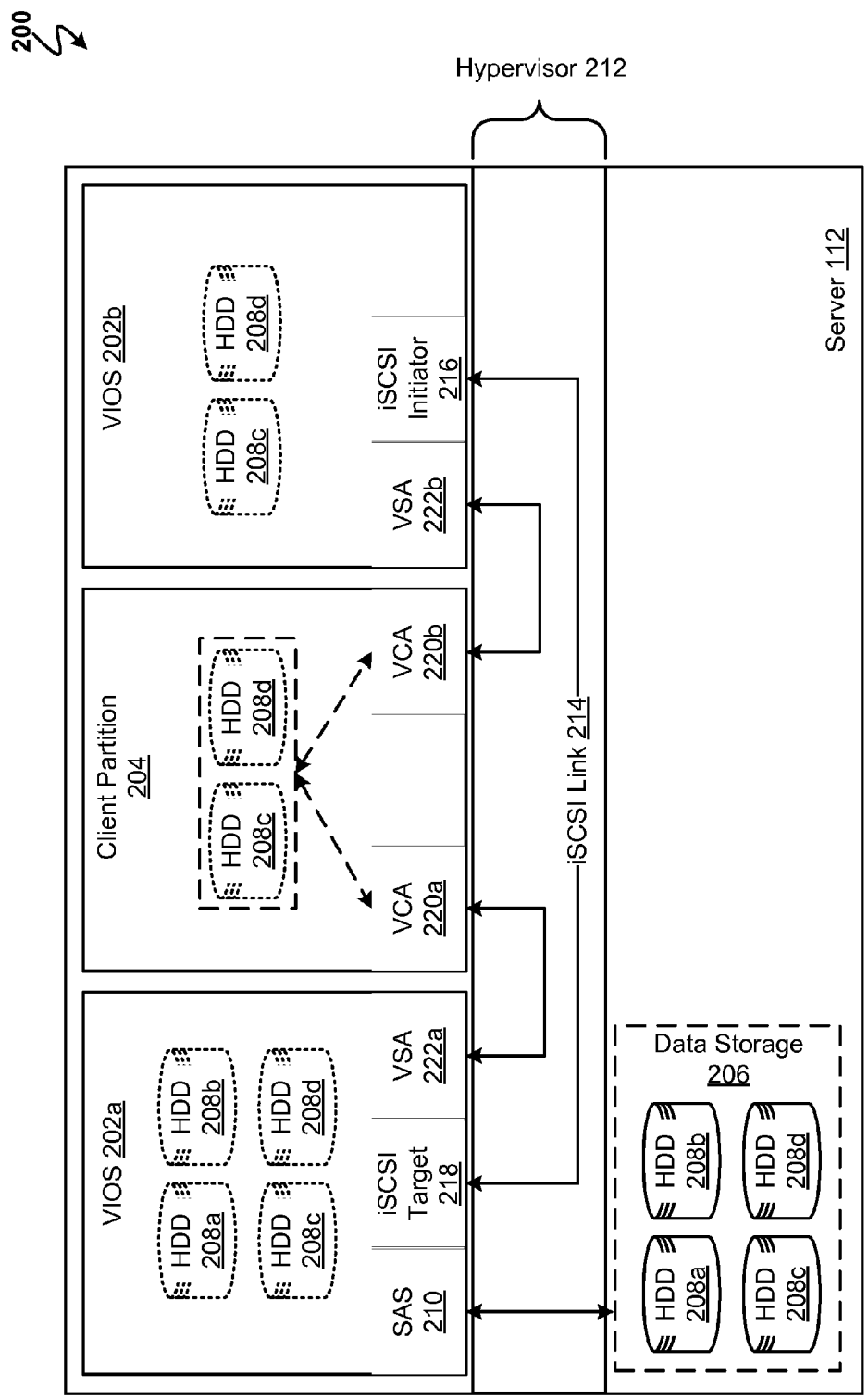
FIG. 2 is a block diagram of a server running a multi-VIOS environment according to at least one embodiment.

Referring now to FIG. 2, a block diagram of a multi-VIOS environment configuration 200 running on a server 112 according to at least one embodiment is depicted. The multi-VIOS environment configuration 200 may include a plurality of VIOS 202a, b instances. The server 112 may also include at least one client partition 204. The server 112 may further include local data storage 206. Data storage 206 may include at least one storage device, such as a hard disk drive (HDD) 208a-d. At least one storage adapter, such as a serial attached small computer system interface adapter (SAS) 210, may be installed in the server 112. Virtual machine instances (e.g., VIOS 202a, b and client partitions 204) may be managed on a server 112 by a virtual machine management entity, such as hypervisor 212 software running on the server 112. The VIOS 202a, b instances and client partition 204 may interact with each other and the server's 112 physical resources (e.g., HDD 208a-d) through the hypervisor 212. The hypervisor 212 may relay data between client partitions 204 and VIOS 202a, b to provide inter-virtual-machine communication. Additionally, the hypervisor 212 may virtualize and assign portions of server 112 resources such as the processor 104 (FIG. 1) and system memory (e.g., random access memory) to client partitions 204 and VIOS 202*a, b* instances.

The client partition 204 may designate one VIOS 202*a, b* instance as a primary VIOS (e.g., 202*a*). The hypervisor 212 may then assign ownership of the SAS 210 to the primary VIOS (e.g., 202*a*) to service the client partition's 204 I/O requests. As the owner of the SAS 210, the primary VIOS (e.g., 202*a*) may have I/O access (e.g., I/O connectivity) to each HDD 208*a-d*. A secondary VIOS (e.g., 202*b*) may be configured to have access to at least a subset of the HDDs (e.g., 208*c, d*) through an I/O path to the primary VIOS (e.g., 202*a*). For example, the VIOS instances 202*a, b* may be linked through an I/O path, such as an internet small computer system interface (iSCSI). An iSCSI link 214 may be created by the hypervisor 212 by configuring the secondary VIOS (e.g., 202*b*) as an iSCSI initiator 216 and the primary VIOS (e.g., 202*a*) as the iSCSI target 218. The secondary VIOS (e.g., 202*b*) may send I/O commands through the iSCSI link 214, whereby the hypervisor 212 may relay the I/O commands to the primary VIOS (e.g., 202*a*). The I/O commands received by the primary VIOS (e.g., 202*a*) may then be sent to at least one of the HDDs (e.g., 208 *c, d*) through the SAS 210 owned by the primary VIOS (e.g., 202*a*).

To provide an I/O path for the client partition's 204 I/O requests to the VIOS 202*a, b* instances, a virtual client storage adapter (VCA) 220*a, b* may be associated with the client partition 204 and a virtual server storage adapter (VSA) 222*a, b* may be associated with a VIOS 202*a, b*. The VCA (e.g., 220*a*) may be linked to a corresponding VSA (e.g., 222*a*) to create an I/O path. Communication through the I/O path between a VCA (e.g., 220*a*) and a corresponding VSA (e.g., 222*a*) may be facilitated by the hypervisor 212. For example, the client partition 204 may send I/O requests through the I/O path, such as a first VCA 220*a* to a first VSA 222*a* link. Through another I/O path, such as a second VCA (e.g., 220*b*) linked to a second VSA (e.g., 222*b*), the client partition 204 may have I/O connectivity to the secondary VIOS (e.g., 202*b*) and a subset of the HDDs (e.g., 208*c, d*). Thus, the client partition 204 may detect I/O access to the same subset of the HDDs (e.g., 208*c, d*) through the secondary VIOS (e.g., 202*b*) and through the primary VIOS (e.g., 202*a*).

Figure 3:
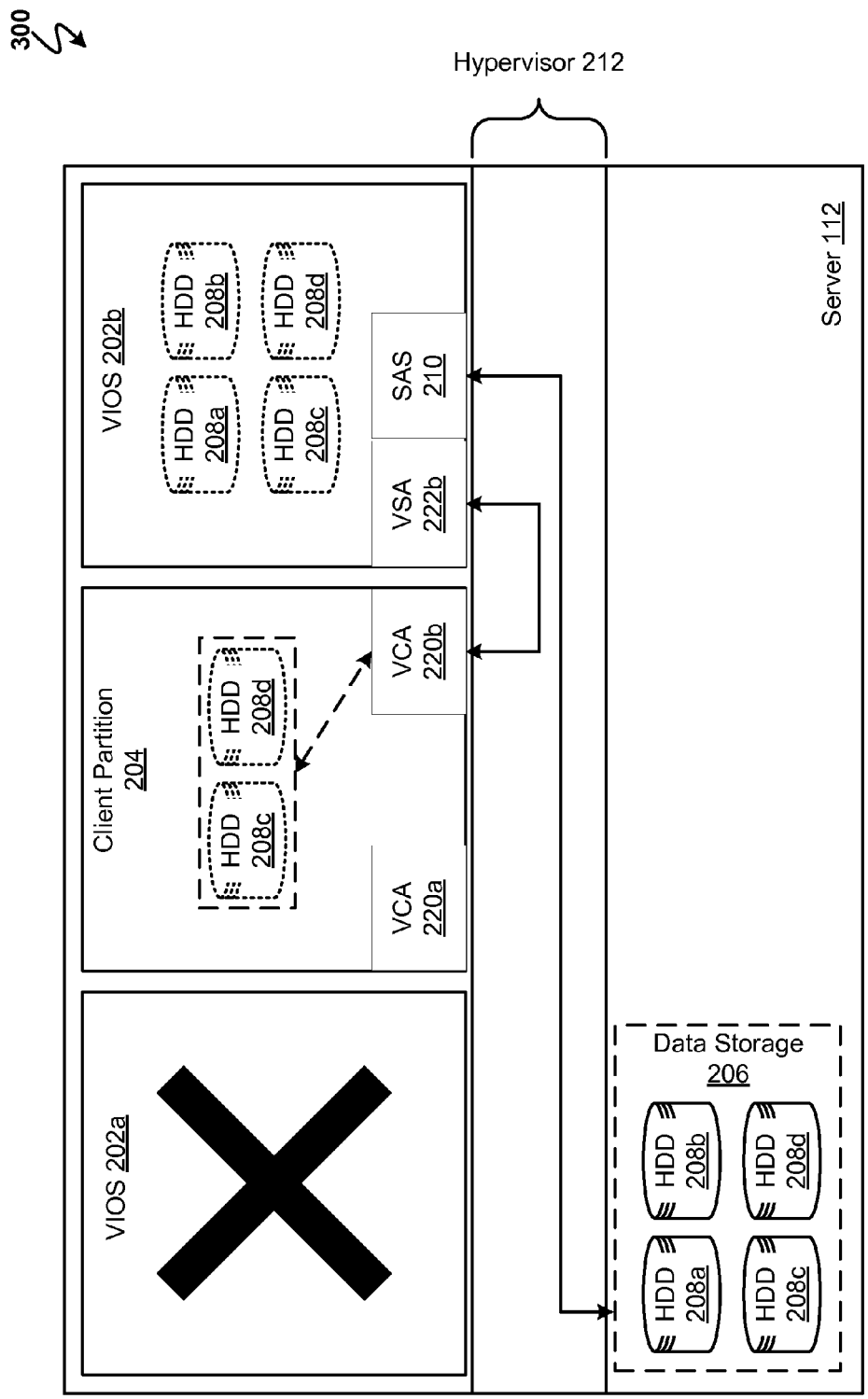
FIG. 3 is a block diagram of a server running a multi-VIOS environment after a failover event according to at least one embodiment.

Referring now to FIG. 3, a block diagram of a server 112 running a multi-VIOS environment after a failover event 300 according to at least one embodiment is depicted. FIG. 3 depicts the multi-VIOS environment 200 (FIG. 2) after the primary VIOS 202*a* has gone down (e.g., failed or crashed). In response to the failure of the primary VIOS 202*a*, the secondary VIOS 202*b* and the client partition 204 may be reconfigured to failover I/O requests through the secondary VIOS 202*b* (i.e., failover event) as will be discussed below with reference to FIGS. 5 and 6. After the failover event, the client partition 204 may have uninterrupted I/O connectivity to the server's 112 HDDs (e.g., 208*c, d*) through the secondary VIOS 202*b*. In order to failover I/O requests from the primary VIOS 202*a* to the secondary VIOS 202*b*, SAS 210 ownership may be moved from the failed primary VIOS 202*a* to the secondary VIOS 202*b*. As such, the secondary VIOS 202*b* may send a request through the hypervisor 212 to a hardware management entity (e.g., hardware management console) to move the SAS 210 (i.e., unassign the SAS 210 from the primary VIOS 202*a* and then assign the SAS 210 to the secondary VIOS 202*b*). After the secondary VIOS 202*b* takes ownership of the SAS 210, the secondary VIOS 202*b* may then have access to the HDDs (e.g., 208*a-d*) that the primary VIOS 202*a* had access to and may serve the client partition's I/O requests.

Figure 4:
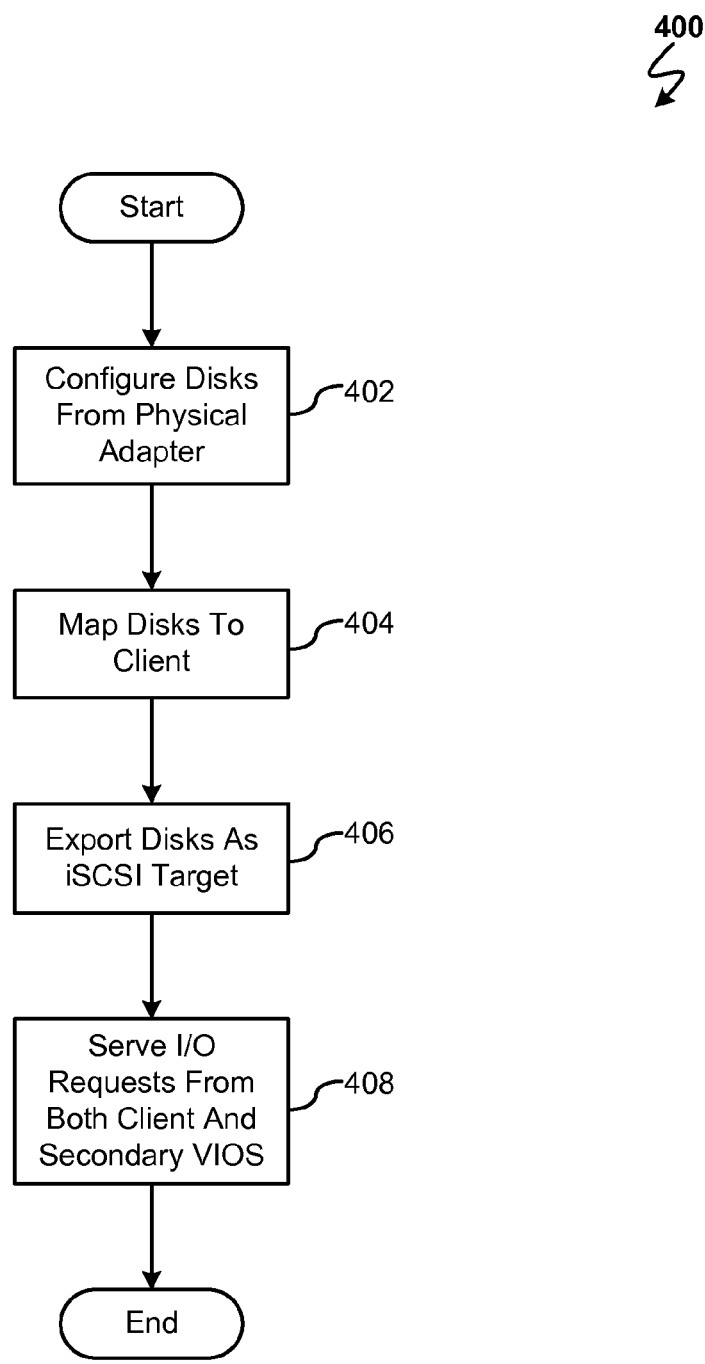
FIG. 4 is an operational flow chart illustrating a process for configuring a primary VIOS according to at least one embodiment.

Referring now to FIG. 4, an operational flow chart illustrating the exemplary primary configuration process 400 by the primary VIOS 202*a* (FIG. 2) according to at least one embodiment is depicted.

At 402, the primary VIOS 202*a* (FIG. 2) may be configured to access storage devices, such as HDDs 208*a-d* (FIG. 2), from the physical storage adapter (e.g., SAS 210: FIG. 2). According to at least one embodiment, the primary VIOS 202*a* (FIG. 2) may be given ownership of the physical storage adapter (e.g., SAS 210: FIG. 2) by the hardware management entity (e.g., hardware management console (HMC)). Once given ownership of the physical storage adapter (e.g., SAS 210: FIG. 2), the storage devices (e.g., HDDs 208*a-d*: FIG. 2) mapped to the physical storage adapter (e.g., SAS 210: FIG. 2) may be visible to the primary VIOS 202*a* (FIG. 2).

For example, HDDs 208*a-d* (FIG. 2) may be mapped to the SAS 210 (FIG. 2). The hardware management console may then give ownership of the SAS 210 (FIG. 2) to the primary VIOS 202*a* (FIG. 2). Once the primary VIOS 202*a* (FIG. 2) becomes the owner of the SAS 210 (FIG. 2), the mapped HDDs 208*a-d* (FIG. 2) may be accessible to the primary VIOS 202*a* (FIG. 2).

Next, at 404, the primary VIOS 202*a* (FIG. 2) may map a subset of HDDs (e.g., 208*c, d*: FIG. 2) required by the client partition 204 (FIG. 2) to the client partition 204 (FIG. 2). According to at least one embodiment, the primary VIOS 202*a* (FIG. 2) may send a request to the hypervisor 212 (FIG. 2) to create I/O connectivity between the primary VIOS 202*a* (FIG. 2) and the client partition 204 (FIG. 2). The hypervisor 212 (FIG. 2) may respond to this request, for example, by creating a VSA 222*a* (FIG. 2) associated with the primary VIOS 202*a* (FIG. 2) linked to a VCA 220*a* (FIG. 2), that may also be created by the hypervisor 212 (FIG. 2) and associated with the client partition 204 (FIG. 2). Thereafter, I/O requests may be relayed by the hypervisor 212 (FIG. 2) between the VSA 222*a* (FIG. 2) and the corresponding VCA 220*a* (FIG. 2).

Then, at 406, the subset of HDDs (e.g., 208*c, d*: FIG. 2) required by the client partition 204 (FIG. 2) may be exported for access as an iSCSI target 218 (FIG. 2) to serve I/O operations for at least one secondary VIOS (e.g., 202*b*: FIG. 2). According to at least one embodiment, the primary VIOS 202*a* (FIG. 2) may be configured as an iSCSI target 218 (FIG. 2) for the secondary VIOS 202*b* (FIG. 2). Once configured as the iSCSI target 218 (FIG. 2), the primary VIOS 202*a* (FIG. 2) may give I/O connectivity for the subset of HDDs (e.g., 208*c, d*: FIG. 2) through an iSCSI link 214 (FIG. 2) to the secondary VIOS 202*b* (FIG. 2) that may provide redundant I/O connectivity to the client partition 204 (FIG. 2). For example, if the client partition 204 (FIG. 2) requires HHDs 208*c, d* (FIG. 2), the primary VIOS 202*a* (FIG. 2) may be configured as an iSCSI target 218 (FIG. 2) to export HDDs 208*c, d* (FIG. 2) to secondary VIOS 202*b* (FIG. 2). The secondary VIOS 202*b* (FIG. 2) may then be configured as an iSCSI initiator 216 (FIG. 2) as will be discussed below with regard to FIG. 5. With the primary VIOS 202*a* (FIG. 2) configured as the iSCSI target 218 (FIG. 2) and the secondary VIOS 202*b* (FIG. 2) configured as an iSCSI initiator 216 (FIG. 2), the primary VIOS 202*a* (FIG. 2) and secondary VIOS 202*b* (FIG. 2) may communicate using SCSI commands via the iSCSI link 214 (FIG. 2) that may be administered by the hypervisor 212 (FIG. 2).

At 408, the primary VIOS 202*a* (FIG. 2) may now serve I/O requests from both the client partition 204 (FIG. 2) and the secondary VIOS 202b (FIG. 2). After the primary VIOS 202a (FIG. 2) has mapped storage devices (e.g., HDDs 208c, d: FIG. 2) to the client partition 204 (FIG. 2) at 404, and been configured as an iSCSI target 218 (FIG. 2) at 406, the primary VIOS 202a (FIG. 2) may process I/O requests through the associated VSA 222a (FIG. 2) to the client partition 204 (FIG. 2), or the iSCSI link 214 (FIG. 2) to the secondary VIOS 202b (FIG. 2).

Figure 5:
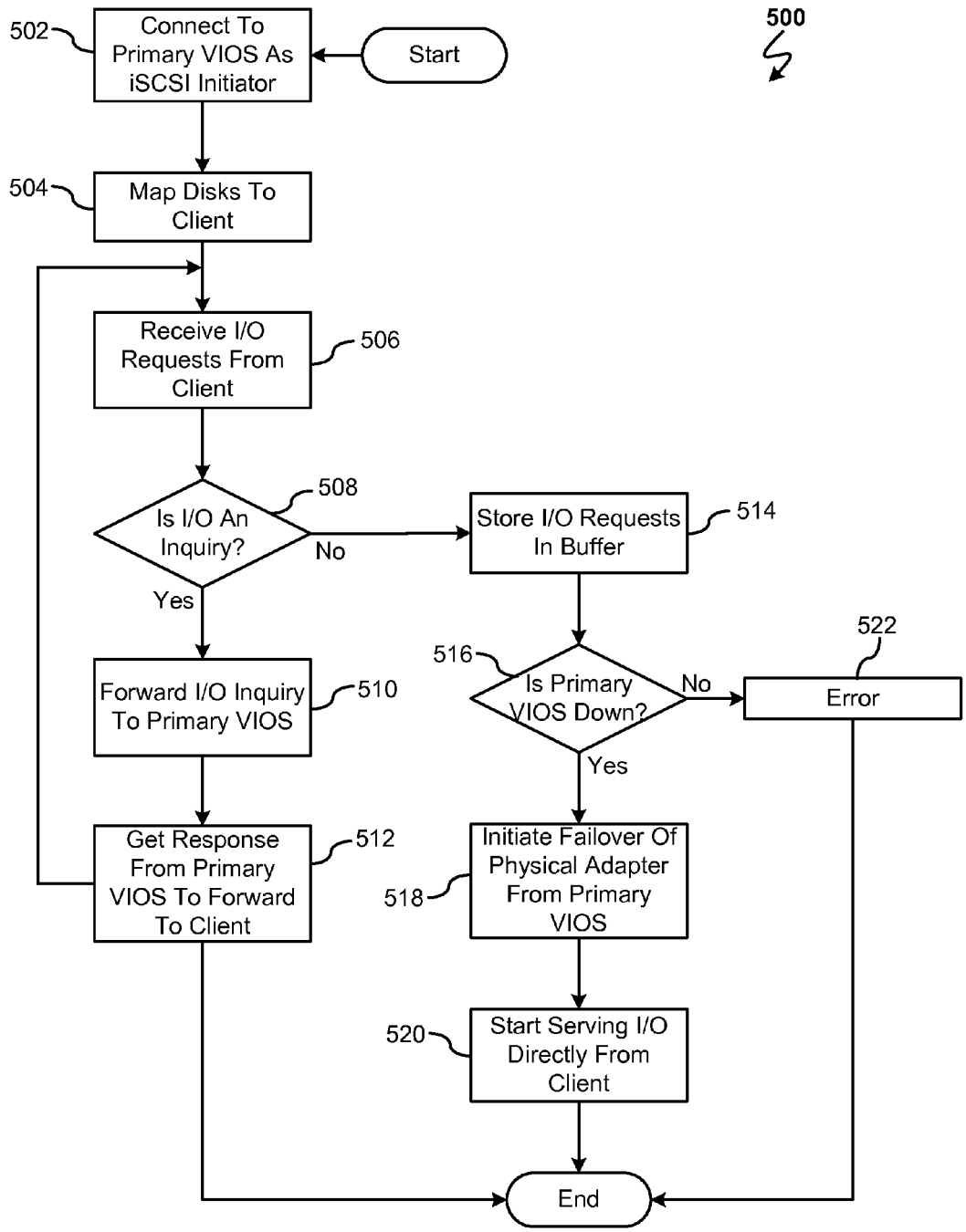
FIG. 5 is an operational flow chart illustrating a process for configuring a secondary VIOS to respond to a failover event according to at least one embodiment.

Referring now to FIG. 5, an operational flow chart illustrating the exemplary secondary I/O process 500 by the secondary VIOS 202b (FIG. 2) according to at least one embodiment is depicted.

At 502, the secondary VIOS 202b (FIG. 2) may be connected to the primary VIOS 202a (FIG. 2) through an iSCSI link 214 (FIG. 2) to access HDDs 208 a-d (FIG. 2) as an iSCSI initiator 216 (FIG. 2). As described above at 406 (FIG. 4), the secondary VIOS 202b (FIG. 2) may be linked to the primary VIOS 202a (FIG. 2) using the iSCSI link 214 (FIG. 2) to have I/O connectivity with the HDDs 208a-d (FIG. 2) that the primary VIOS 202a (FIG. 2) may access through the SAS 210 (FIG. 2). According to at least one embodiment, the secondary VIOS 202b (FIG. 2) may be given I/O access to the HDDs (e.g., 208c, d: FIG. 2) that the client partition 204 (FIG. 2) requires through the iSCSI link 214 (FIG. 2) to the primary VIOS 202a (FIG. 2).

Next, at 504, the secondary VIOS 202b (FIG. 2) may map a subset of HDDs (e.g., 208c, d: FIG. 2) required by the client partition 204 (FIG. 2) to the client partition 204 (FIG. 2). According to at least one embodiment, the secondary VIOS 202b (FIG. 2) may send a request to the hypervisor 212 (FIG. 2) to create I/O connectivity between the secondary VIOS 202b (FIG. 2) and the client partition 204 (FIG. 2). The hypervisor 212 (FIG. 2) may respond to this request, for example, by creating a VSA 222b (FIG. 2) associated with the secondary VIOS 202b (FIG. 2) linked to a VCA 220b (FIG. 2), that may also be created by the hypervisor 212 (FIG. 2) and associated with the client partition 204 (FIG. 2). Thereafter, I/O requests may be relayed by the hypervisor 212 (FIG. 2) between the VSA 222b (FIG. 2) and the linked VCA 220b (FIG. 2).

Then, at 506, the secondary I/O process 500 may receive I/O requests from the client partition 204 (FIG. 2). According to at least one embodiment, the received I/O requests may be sent from the VCA 220b (FIG. 2) associated with the client partition 204 (FIG. 2) to the VSA 222b (FIG. 2) associated with the secondary VIOS 202b (FIG. 2).

At 508, the received I/O requests may then be analyzed to determine if the I/O request from the client partition 204 (FIG. 2) is an inquiry (e.g., a SCSI inquiry command). If the I/O request received from the client partition 204 (FIG. 2) is determined to be an inquiry at 508, the secondary VIOS 202b (FIG. 2) may forward the inquiry to the primary VIOS 202a (FIG. 2) at 510. According to at least one embodiment, the secondary VIOS 202b (FIG. 2) may forward the inquiry through the iSCSI link 214 (FIG. 2) to the primary VIOS 202a (FIG. 2).

Once the secondary VIOS 202b (FIG. 2) receives a response to the inquiry from the primary VIOS 202a (FIG. 2), the secondary VIOS 202b (FIG. 2) may forward the inquiry response to the client partition 204 (FIG. 2) at 512. According to at least one embodiment, the response from the primary VIOS 202a (FIG. 2) may be sent to the secondary VIOS 202b (FIG. 2) through the iSCSI link 214 (FIG. 2) and then forwarded by the secondary VIOS 202b (FIG. 2) though the associated VSA 222b (FIG. 2) to the client partition's associated VCA 220b (FIG. 2).

However, if it is determined that the I/O request received is not an inquiry at 508, the I/O request may then be stored in memory, such as a data buffer, at 514. The presence of an I/O request from the client partition 204 (FIG. 2) that is not an inquiry may indicate that the primary VIOS 202a (FIG. 2) has gone down (e.g., crashed). If the client partition 204 (FIG. 2) has sent an I/O request that is not an inquiry, the client partition 204 (FIG. 2) may have sent the I/O request to the secondary VIOS 202b (FIG. 2) in response to a primary VIOS 202a (FIG. 2) failure (e.g., primary VIOS crash) as will be discussed below with reference to FIG. 6. Such I/O requests may be stored in memory, as a data buffer for example, to ensure that the I/O requests may not be lost while the secondary VIOS 202b (FIG. 2) determines if the primary VIOS 202a (FIG. 2) may be down and initiates failover procedures if necessary.

At 516, the secondary VIOS 202b (FIG. 2) may determine if the primary VIOS 202a (FIG. 2) has gone down. According to at least one embodiment, the secondary VIOS 202b (FIG. 2) may use an inter-VIOS heartbeat mechanism determine if the primary VIOS 202a (FIG. 2) has gone down. The inter-VIOS heartbeat mechanism may operate by sending communications to the primary VIOS 202a (FIG. 2) at regular time intervals and receiving communications in response. If the secondary VIOS 202b (FIG. 2) fails to receive responses to the inter-VIOS heartbeat communications, the secondary VIOS 202b (FIG. 2) may determine that the primary VIOS 202a (FIG. 2) may be down. According to at least one other embodiment, the secondary VIOS 202b (FIG. 2) may send a status inquiry to the primary VIOS 202a (FIG. 2) to determine if the primary VIOS 202a (FIG. 2) may be down in response to receiving non-inquiry I/O requests from the client partition 204 (FIG. 2). If the secondary VIOS 202b (FIG. 2) does not receive a response to the status inquiry from the primary VIOS 202a (FIG. 2) within a predetermined timeframe, the secondary VIOS 202b (FIG. 2) may determine that the primary VIOS 202a (FIG. 2) may be down.

If the secondary VIOS 202b (FIG. 2) determined that the primary VIOS 202a (FIG. 2) may be down at 516, the secondary VIOS 202b (FIG. 2) may initiate failover of the physical storage adapter (e.g., SAS 210: FIG. 2) from the primary VIOS 202a (FIG. 2) at 518. According to at least one embodiment the secondary VIOS 202b (FIG. 2) may initiate failover of the physical storage adapter (e.g., SAS 210: FIG. 2) by sending a request through virtual machine management (e.g., hypervisor 212: FIG. 2) to a hardware management entity (e.g., hardware management console) to have ownership of the physical storage adapter (e.g., SAS 210: FIG. 2) transferred from the primary VIOS 202a (FIG. 2) to the secondary VIOS 202b (FIG. 2).

Next, at 520, the secondary VIOS 202b (FIG. 3) may start serving I/O requests directly from the client partition 204 (FIG. 3). Once the secondary VIOS 202b (FIG. 3) has ownership of the physical storage adapter (e.g., SAS 210: FIG. 3), the secondary VIOS 202b (FIG. 3) may directly access the HDDs (e.g., 208 a-d: FIG. 3) associated with the physical storage adapter (e.g., SAS 210: FIG. 3). With direct access to the HDDs (e.g., 208 a-d: FIG. 3) through the physical storage adapter (e.g., SAS 210: FIG. 3), the secondary VIOS 202b (FIG. 3) may begin serving the I/O requests directly from the client partition 204 (FIG. 3). According to at least one embodiment, the secondary VIOS 202b (FIG. 3) may begin serving I/O requests by processing the I/O requests that were stored in memory (e.g., buffer) at 514 to provide uninterrupted I/O service to the client partition 204 (FIG. 3).

However, if the secondary VIOS 202b (FIG. 2) determined that the primary VIOS 202a (FIG. 2) may not be down at 516, the secondary I/O process 500 may generate an error at 522 due to receiving non-inquiry I/O requests from the client partition 204 (FIG. 2) when the primary VIOS 202a (FIG. 2) may not be down.

Figure 6:
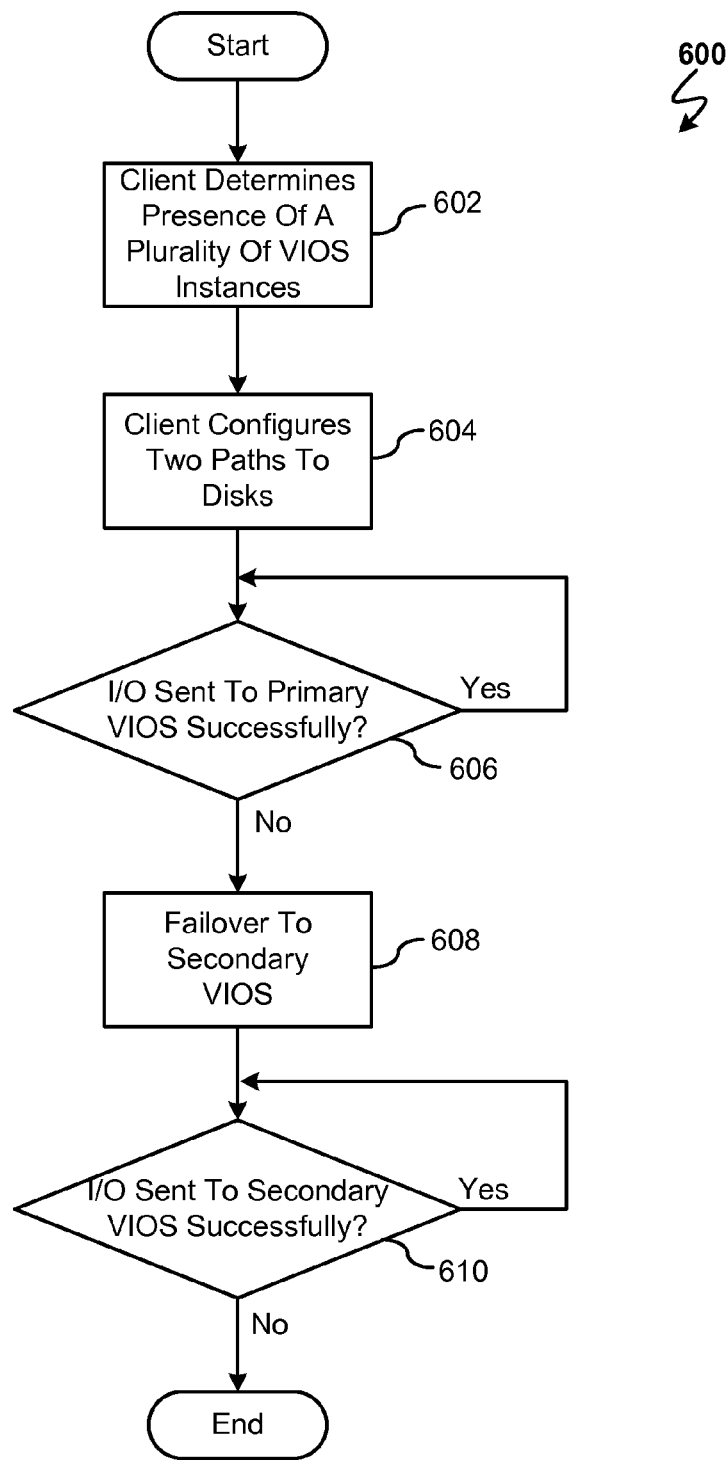
FIG. 6 is an operational flow chart illustrating a process for configuring a client partition to interact with a plurality of VIOS instances according to at least one embodiment.

Referring now to FIG. 6, an operational flow chart illustrating the exemplary client I/O process 600 by the client partition 204 (FIG. 2) according to at least one embodiment is depicted.

At 602, the client partition 204 (FIG. 2) may determine that a plurality of VIOS instances (e.g., 202a, b: FIG. 2) may have access to the server's storage devices (e.g., HDDs 208 a-d: FIG. 2). According to at least one embodiment, the client partition 204 (FIG. 2) may send a SCSI inquiry command through the VCA-to-VSA links established by the primary configuration process 400 (FIG. 4) at 404 (FIG. 4) and the secondary I/O process 500 (FIG. 5) at 504 (FIG. 5) as described above previously. For example, a client partition 204 (FIG. 2) may send a SCSI inquiry command through the VCAs (e.g., 220a, b: FIG. 2) associated with the client partition 204 (FIG. 2). The client partition 204 (FIG. 2) may then receive two responses to the SCSI inquiry, one from each VIOS 202a, b (FIG. 2), through the VCAs (e.g., 220a, b: FIG. 2) associated with the client partition 204 (FIG. 2). The two inquiry responses may contain the same data (e.g., hard disk identification) indicating that there are two I/O paths through two VIOSes 202a, b (FIG. 2) to the same server 112 (FIG. 2) HDDs 208a-d (FIG. 2).

Next, at 604, the client partition 204 (FIG. 2) may configure paths to the storage devices (e.g., HDDs) through each VIOS 202a, b (FIG. 2). In the course of the path configuration, the client partition 204 (FIG. 2) may designate one VIOS as the primary VIOS (e.g., 202a: FIG. 2) to send I/O requests. According to at least one embodiment, each VIOS 202a, b (FIG. 2) may have an associated path priority value. The VIOS (e.g., 202a: FIG. 2) with the highest associated path priority value may become the target for the client partition's 204 (FIG. 2) I/O requests. Furthermore, any other VIOS instances (e.g., 202b: FIG. 2) may be designated to be used for failover.

Then, at 606, the client I/O process 600 may determine if I/O requests have been sent successfully to the primary VIOS 202a (FIG. 2). According to at least one embodiment, the client partition 204 (FIG. 2) may send I/O requests out to the primary VIOS 202a (FIG. 2) and may wait a predetermined amount of time for a response. If no response is received within the predetermined amount of time for a response, the client partition 204 (FIG. 2) may attempt to resend the I/O request again. If the client partition 204 (FIG. 2) does not receive a response to sent I/O requests after a predetermined number of attempts (e.g., five attempts), the client partition 204 (FIG. 2) may determine that the I/O request may not be reaching the primary VIOS 202a (FIG. 2) successfully and thus the primary VIOS 202a (FIG. 2) may be down (i.e., inaccessible).

If the client partition 204 (FIG. 2) detected, at 606, that I/O requests may not be successfully reaching the primary VIOS 202a (FIG. 2), the client partition 204 (FIG. 2) may failover to the secondary VIOS 202b (FIG. 2) at 608. According to at least one embodiment, the client partition 204 (FIG. 2) may fail over to the secondary VIOS 202b (FIG. 2) by ceasing to send I/O requests to the VCA 220a (FIG. 2) linked to the primary VIOS 202a (FIG. 2) and instead failover to sending I/O requests to the VCA 220b (FIG. 2) linked to the secondary VIOS 202b (FIG. 2).

After failover to the secondary VIOS 202b (FIG. 3), the client partition 204 (FIG. 3) may determine if I/O requests have been sent successfully to the secondary VIOS 202b (FIG. 3) at 610. The client partition 204 (FIG. 3) may determine if sent I/O requests may not be successfully received by employing the method described above at 606. According to at least one embodiment, if the client partition 204 (FIG. 3) has determined that I/O requests may not be successfully reaching the secondary VIOS 202b (FIG. 3), the client partition 204 (FIG. 3) may failover to another VIOS, if available. Additionally, the client I/O process 600 may be used by multiple client partitions 204 (FIG. 2), if present, to failover from one VIOS (e.g., 202a: FIG. 2) to another VIOS (e.g., 202b: FIG. 2).

According to at least one embodiment, in situations where a previously down VIOS (e.g., 202a: FIG. 2) subsequently comes back up, the VIOS (e.g., 202a: FIG. 2) that was down may request that the hardware management entity (e.g., hardware management console) transfer ownership of the physical storage adapter 210 (FIG. 2) back to the VIOS (e.g., 202a: FIG. 2) that had been down previously. For example, if the primary VIOS 202a (FIG. 2) goes down, I/O requests from the client partition 204 (FIG. 2) may failover to the secondary VIOS 202b (FIG. 2). The primary VIOS 202a (FIG. 2) may then restart the primary configuration process 400 (FIG. 4) to map the HDDs 208a-d (FIG. 2) to the client partition 204 (FIG. 2). The secondary VIOS 202b (FIG. 2) may further fail the I/O requests from the client partition 204 (FIG. 2) and be configured as the iSCSI initiator 216 again. The client partition 204 (FIG. 2) may then detect that the I/O path to the primary VIOS 202a (FIG. 2) may be available again and resume sending I/O requests to the primary VIOS 202a (FIG. 2).

Figure 7:
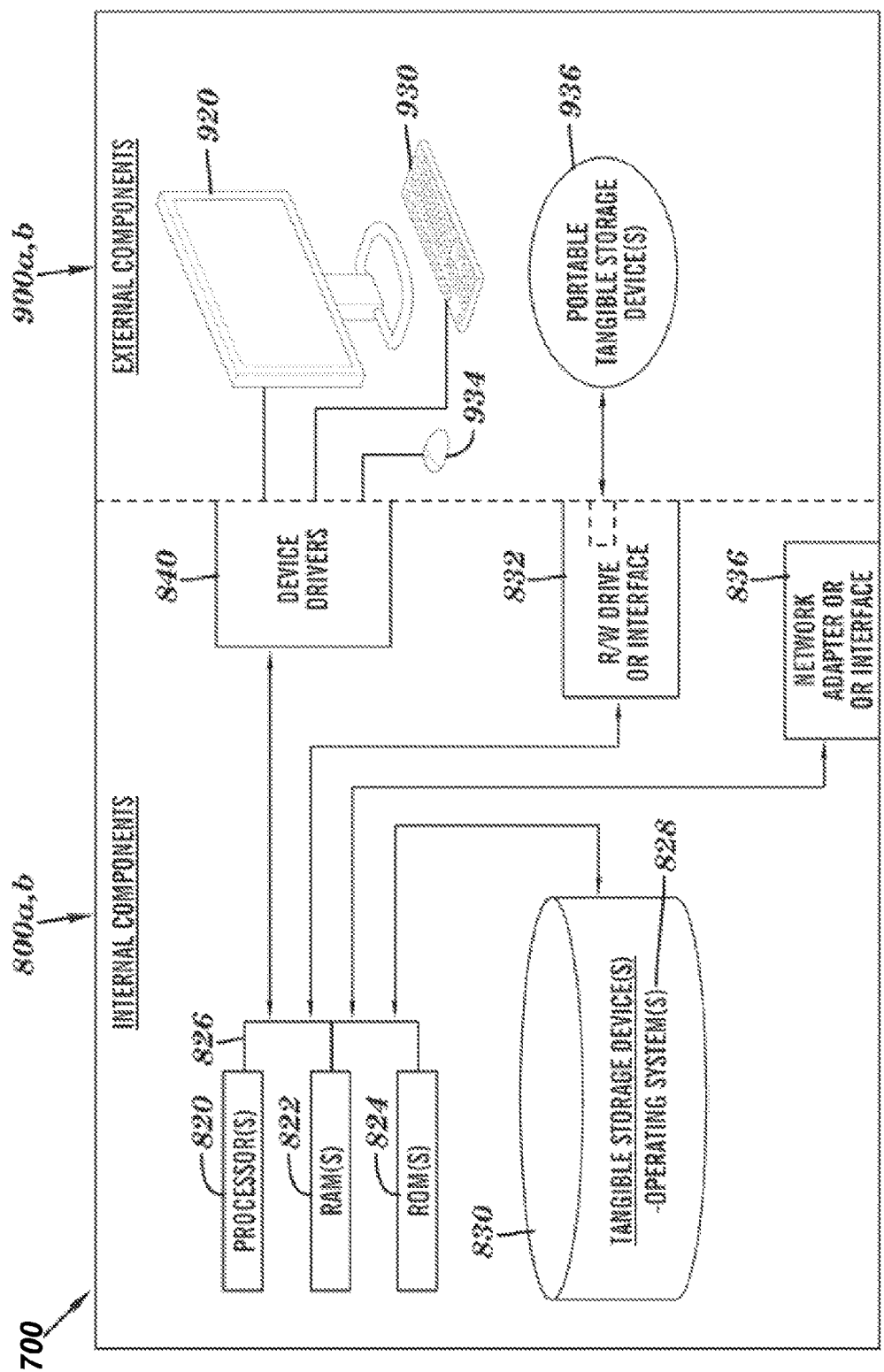
FIG. 7 is a block diagram of internal and external components of computers and servers depicted in FIG. 1 according to at least one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 7. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a multi-VIOS environment 108a and 108b (FIG. 1), may be stored on one or more computer-readable tangible storage devices 830 for execution by one or more processors 820 via one or more RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The multi-VIOS environment 108a and 108b (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The multi-VIOS environment 108a (FIG. 1) in client computer 102 (FIG. 1) and the multi-VIOS environment 108b (FIG. 1) in network server computer 112 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the multi-VIOS environment 108a (FIG. 1) in client computer 102 (FIG. 1) and the multi-VIOS environment 108b (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for virtual input output server (VIOS) failover in an environment with a physical storage adapter, the method comprising:

assigning the physical storage adapter to a first VIOS, wherein the physical storage adapter has input output (I/O) connectivity to at least one storage device;

configuring a first I/O path between the first VIOS and a second VIOS, wherein the second VIOS has access to the at least one storage device through the first VIOS;

configuring a second I/O path from a client partition to the first VIOS and the at least one storage device through the physical storage adapter assigned to the first VIOS, wherein the second I/O path is set as a primary I/O path for an I/O request sent by the client partition;

configuring a third I/O path from the client partition to the second VIOS, wherein the client partition is enabled to access the at least one storage device through a combination of the third I/O path and the first I/O path;

determining the first VIOS is inaccessible;

unassigning the physical storage adapter from the first VIOS based on the determining the first VIOS is inaccessible, wherein unassigning the physical storage adapter from the first VIOS comprises the second VIOS sending a request to a virtual machine manager to move the physical storage adapter from the first VIOS to the second VIOS; and assigning the physical storage adapter to the second VIOS based on the unassigning of the physical adapter from the first VIOS.

2. The method of claim 1, wherein the determining the first VIOS is inaccessible comprises the second VIOS detecting the first VIOS is unresponsive to an inter-VIOS heartbeat communication.

3. The method of claim 1, wherein the determining the first VIOS is inaccessible comprises the client partition detecting that the first VIOS has not responded to an I/O request sent by the client partition through the second I/O path to the first VIOS.

4. The method of claim 1, wherein the determining the first VIOS is inaccessible comprises detecting that the client partition is sending a plurality of I/O requests through the third I/O path to the second VIOS.

5. The method of claim 4, wherein the determining the first VIOS is inaccessible comprises, the secondary VIOS storing the sent plurality of I/O requests in a data buffer until the physical storage adapter is assigned to the secondary VIOS.

6. The method of claim 1, wherein configuring a second I/O path from a client partition to the first VIOS comprises creating a first client virtual storage adapter associated with the client partition and creating a first server virtual storage adapter associated with the first VIOS, wherein the first client virtual storage adapter has I/O connectivity with the first server virtual storage adapter.

7. The method of claim 1, wherein configuring a third I/O path from a client partition to the second VIOS comprises creating a second client virtual storage adapter associated with the client partition and creating a second server virtual storage adapter associated with the second VIOS, wherein the second client virtual storage adapter has I/O connectivity with the second server virtual storage adapter.

8. The method of claim 1, wherein the configuring a first I/O path between the first VIOS and a second VIOS comprises creating an internet small computer system interface (iSCSI) link between the first VIOS and second VIOS by designating the first VIOS as an iSCSI target and designating the second VIOS as an iSCSI initiator.

* * * * *